United States Patent
Wang

(10) Patent No.: US 7,109,860 B2
(45) Date of Patent: Sep. 19, 2006

(54) SURVEILLANCE APPARATUS INTEGRATED WITH MOBILE PHONE

(75) Inventor: Shun-Ping Wang, Taipei Hsien (TW)

(73) Assignee: Inventec Appliances Corporation, Taipei Hsien (TW)

( * ) Notice: Subject to any disclaimer, the term of this patent is extended or adjusted under 35 U.S.C. 154(b) by 134 days.

(21) Appl. No.: 10/857,903

(22) Filed: Jun. 2, 2004

(65) Prior Publication Data

US 2005/0270143 A1 Dec. 8, 2005

(51) Int. Cl.
*G08B 1/08* (2006.01)

(52) U.S. Cl. .......... 340/539.11; 340/330; 340/539.25; 340/5.2; 348/14.01; 348/14.02; 348/14.11; 379/102.06; 379/160; 379/167.05

(58) Field of Classification Search .......... 340/539.11, 340/539.25, 328, 330, 937, 540, 5.2; 348/14.01, 348/14.02, 14.03, 14.05, 14.11; 455/410; 379/422, 423, 102.06, 160, 167.05, 167.11, 379/167.13, 167.14
See application file for complete search history.

(56) References Cited

U.S. PATENT DOCUMENTS

| | | | |
|---|---|---|---|
| 6,559,769 B1 * | 5/2003 | Anthony et al. | 340/574 |
| 6,658,091 B1 * | 12/2003 | Naidoo et al. | 379/37 |
| 6,709,172 B1 * | 3/2004 | Brown | 396/427 |
| 6,753,774 B1 * | 6/2004 | Pan et al. | 340/539.11 |
| 6,759,957 B1 * | 7/2004 | Murakami et al. | 340/541 |
| 6,930,599 B1 * | 8/2005 | Naidoo et al. | 340/539.1 |
| 6,950,725 B1 * | 9/2005 | von Kannewurff et al. | 700/275 |

* cited by examiner

*Primary Examiner*—Davetta W. Goins
(74) *Attorney, Agent, or Firm*—Bacon & Thomas, PLLC

(57) ABSTRACT

The present invention is to provide a surveillance apparatus for monitoring the situation of a visitor through a mobile phone, which comprises a monitor assembly including a microprocessor, a digital/analog converter connected to the microprocessor, an electric bell, a microphone, and a speaker. If the electric bell is pressed, a visit signal will be sent to the microprocessor. After the microprocessor has received the visit signal, a notice signal is sent immediately from a switchboard through at least one base station to a mobile phone. After the mobile phone is connected, a bidirectional signal communication can be made between the mobile phone and the microphone and the speaker.

4 Claims, 2 Drawing Sheets

SURVEILLANCE APPARATUS INTEGRATED WITH MOBILE PHONE

FIELD OF THE INVENTION

The present invention relates to a surveillance apparatus, more particularly to a surveillance apparatus integrated with a mobile phone, which is able to send a visit signal to the mobile phone while an electric bell of the surveillance apparatus is pressed by a visitor and achieve a bidirectional signal communication between the surveillance apparatus and the mobile phone through a microphone and a speaker of the surveillance apparatus.

BACKGROUND OF THE INVENTION

At present, our world has entered into a blooming technological development stage of a new era, and various electronic or information products derived from a microprocessor are introduced continuously to bring tremendous convenience to people, which is indispensable to our daily life. As all kinds of information and electronic products are developed and improved continuously, people have high demands on quality accordingly. Therefore, it is not difficult to see whether or not the future information and electronic devices will bring us a more convenient, effective, and humanistic service, which is also an important index for evaluating whether or not the development and manufacture technologies for information and electronic products of a country lead other countries.

It should be a common experience for many people that one of our good friends unexpectedly pays us a visit at home while we are out. Then, if such visitor still remembers our mobile phone number, it only takes a phone call for the visitor to contact with us. However, if the visitor forgets our phone number, then the visitor is forced to leave with disappointments Further, if you want to purchase a set of CDs for learning English, but you are at work while a salesperson knocks at your door to promote the sale of such kind of CDs, then you will miss the chance of buying those CDs from that salesperson. In the meanwhile, it also has a hidden risk that a salesperson may come up with an evil mind of stealing things from your home after that salesperson rings your door bell and nobody answers the door, and it thus confirms that no one is in the house of the visiting family.

If there is a computer device integrated with the popular mobile phone, then we can monitor the situation of a visitor through the mobile phone at a remote end. Such arrangement is definitely a big contribution to the extensive consumers. As to the computer and mobile phone manufacturers, it is a great idea and tool for increasing the sales volume of their products.

SUMMARY OF THE INVENTION

In view of the situations such as a good friend pays a visit to somebody's house unexpectedly while the host is out and thus causing the good friend to leave with disappointments; any visitor (such as a salesperson or a fee collector) calls at someone's house and the purpose of such visit is not known in advance; even worse, someone finds out that there is nobody answering the door after pressing the door bell and it confirms that nobody is in the house of the visiting family, and as a result, such person may come up with an evil mind of stealing things from such house; or since the competition is very severe in the information appliance, electronic device, and mobile phone markets, any considerate design that benefits the consumers will be a key factor to the sales performance, therefore the inventor of the present invention based on years of experience to think of various feasible solutions and conduct extensive researches, experiments, and improvements and finally invented a surveillance apparatus integrated with a mobile phone with the hope of contributing to the people and the society.

A primary object of the present invention is to provide a surveillance apparatus for monitoring the situation of a visitor through a mobile phone. The surveillance apparatus of the invention comprises a monitor assembly, and the monitor assembly includes a microprocessor, a digital/analog converter connected to the microprocessor, an electric bell, a microphone, and a speaker. If the electric bell is pressed, a visit signal will be sent to the microprocessor. After the microprocessor has received the visit signal, a notice signal is sent immediately from a switchboard to a mobile phone through at least one base station. After the mobile phone is connected, a bidirectional signal communication between the mobile phone and the microphone and the speaker is achieved.

The above and other objects, features and advantages of the present invention will become apparent from the following detailed description taken with the accompanying drawings.

DETAILED DESCRIPTION OF THE PREFERRED EMBODIMENTS

Figure 1:
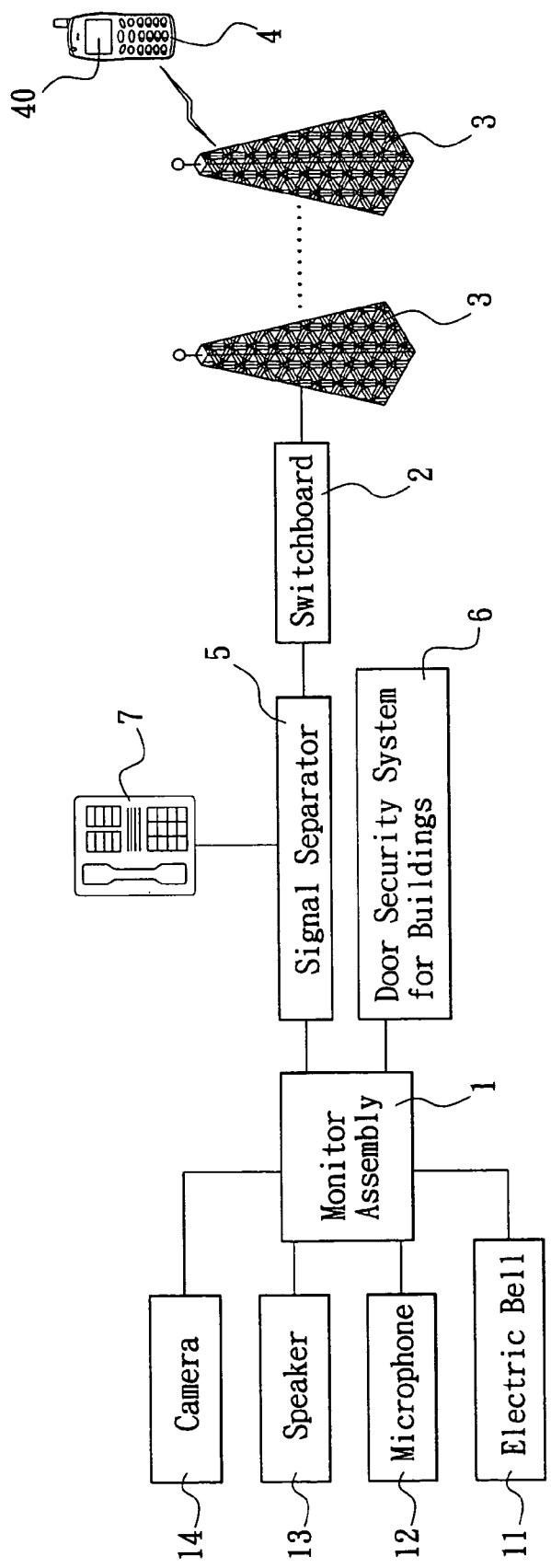
FIG. 1 is a planar view of the connection of the present invention.
Figure 2:
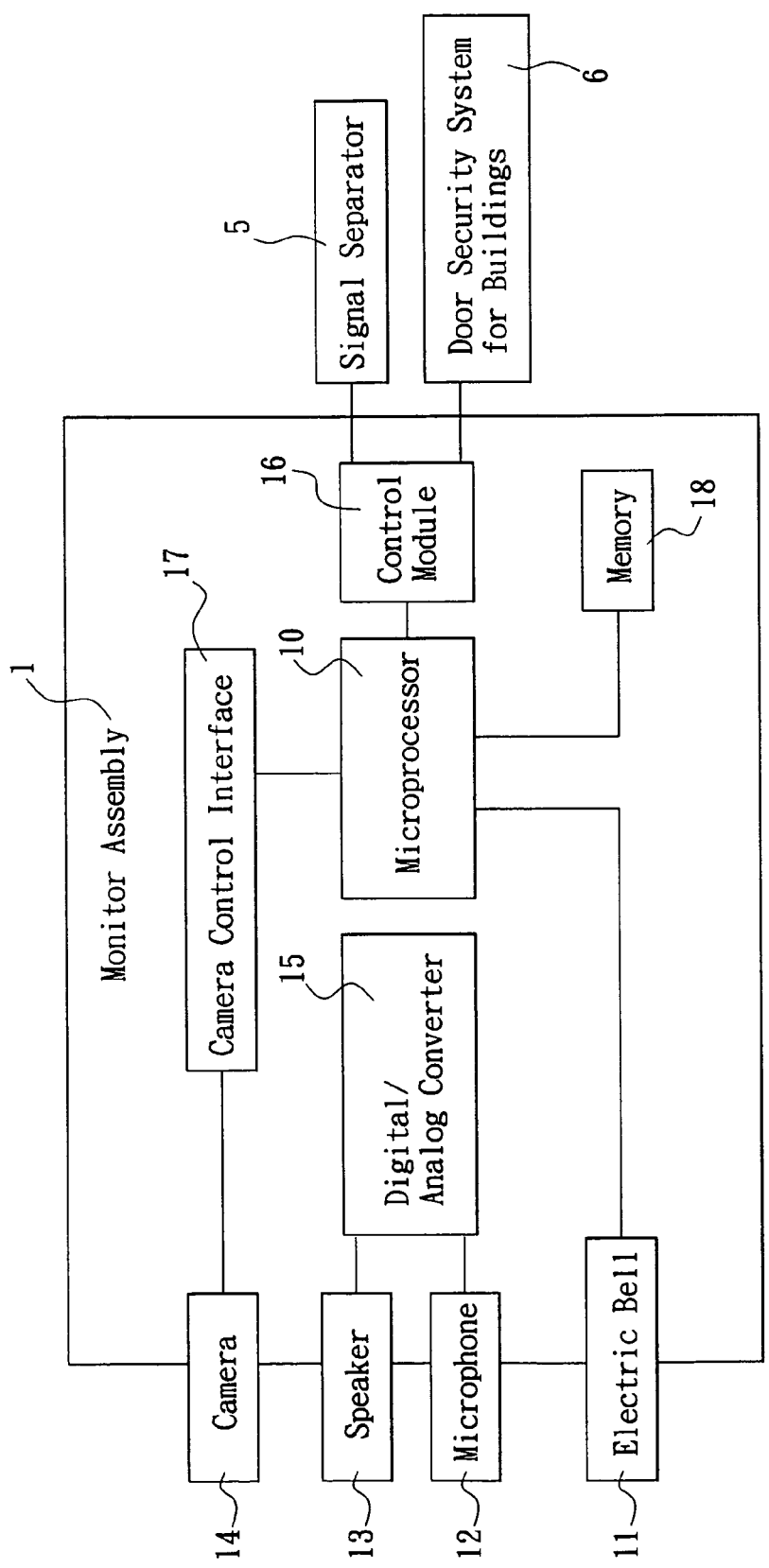
FIG. 2 is a view of the connection of the monitor assembly according to the present invention.

Please refer to FIGS. 1 and 2 for a surveillance apparatus integrated with a mobile phone according to the present invention, which comprises a monitor assembly 1, and the monitor assembly 1 includes a microprocessor 10, a digital/analog converter 15, an electric bell 11, a microphone 12, and a speaker 13; wherein the microprocessor 10 is connected to the digital/analog converter 15 and the electric bell 11; the microphone 12 and the speaker 13 are connected to the digital/analog converter; when the electric bell is pressed, a bell signal is sent to the microprocessor 10; after the microprocessor 10 has received the bell signal, a notice signal is sent immediately to a mobile phone 4 through a switchboard 2 and at least one base station 3; after the mobile phone 4 is connected, a bidirectional signal transmission between the mobile phone 4 and the microphone 12 and the speaker 13 is achieved.

Please refer to FIGS. 1 and 2 for the present invention again. For example, a mobile phone 4 holder is out when a visitor is visiting him/her. After the visitor has pressed the electric bell 11, a bell signal will be sent to the microprocessor 10. After the microprocessor 10 has received the bell signal, a notice signal will be sent immediately to the mobile phone 4 through the switchboard 2 and the base station 3. After the mobile phone is connected, a bidirectional signal communication between the mobile phone and the microphone and the microphone 12 and the speaker 13 is achieved. Therefore the mobile phone 4 holder can use a mobile phone 4 at a remote end to directly ask the visitor (or the person who presses the electric bell 11) through the speaker 13 who the visitor is and the purpose of the visit. The visitor can also communicate with the mobile phone 4 holder directly through the microphone 12.

Please refer to FIGS. 1 and 2 for the present invention again. Since the sound of the visitor sent from the microphone 12 is an analog audio signal, therefore the analog audio signal received by the microphone 12 will be sent to the digital/analog converter 15 and converted into a digital audio signal so as to proceed with the next transmission path.

Please refer to FIGS. 1 and 2 for the present invention again. A signal separator 5 connected to the microprocessor 10 is installed between the monitor assembly 1 and the switchboard 2, and the signal separator 5 is connected to a fixed telephone 7, so that if an external call is dialed to the fixed telephone 7 and the fixed telephone 7 is not picked up, the external call will be sent to a mobile phone 4 through the switchboard 2 and the base station 3. Although the mobile phone 4 holder is not at home, he/she still can receive any call dialed to the fixed telephone 7 at home.

Please refer to FIGS. 1 and 2 for the present invention again. A control module 16 connected to the microprocessor 10 is installed in the monitor assembly 1. One end of the control module 16 is connected to the signal separator 5 and the other end is connected to a door security system of a building. Therefore if a visitor presses the electric bell 11 and the mobile phone 4 holder is at home, then the door security system 6 of the building can be used directly for asking the identity of the visitor or opening the door for the visitor.

Please refer to FIGS. 1 and 2 for the present invention again. The monitor assembly 1 has a camera control interface 17 connected to the microprocessor 10 and the camera control interface 17 is connected to a camera 14, so that if a visitor presses the electric bell 11, the camera 14 will start taking pictures. Such arrangement not only sends a bell signal to the microprocessor 10 when the electric bell 11 is pressed, but also captures a video signal by taking the pictures of the visitor by the camera 14. Then, the video signal is sent to the microprocessor 10. After the microprocessor 10 has received the visit signal and the video signal, a notice signal will be sent immediately to the mobile phone 4 through the switchboard 2 and the base station 3. When the mobile phone 4 holder connects the mobile phone 4, the mobile phone 4 holder not only can ask the identity of the visitor (or the person who presses the electric bell 11), but also can view the image of the visitor on a screen 40 of the mobile phone 4. Therefore, the object of having a better surveillance is accomplished.

Please refer to FIGS. 1 and 2 for the present invention again. The monitor assembly 1 has a memory 18 connected to the microprocessor 10 for recording the conversion between the visitor and the mobile phone 4 holder or being used as a buffer for the signals.

With the description above, profound theories are explained in simple language, and it is believed that our examiner can fully understand the present invention. However, a real-life example is given below to demonstrate the essence of the invention.

Assumed that Mr. Wang resides at Hsin Yi District of Taipei and is working at Chung Cheng District of Taipei and an encyclopedia salesperson, Mr. Li pays a visit to Mr. Wang's home. After Mr. Li presses the electric bell 11, a bell signal is sent to the microprocessor 10. After the microprocessor 10 has received the bell signal, a notice signal is sent immediately to the mobile phone 4 through the switchboard 2 and the base stations 3, so that after the mobile phone 4 rings and Mr. Wang picks up the mobile phone 4, a bidirectional communication between the mobile phone 4 and the microphone 12 and the speaker 13 is achieved. Therefore, Mr. Wang can use the mobile phone 4 at a remote end to view the visitor's appearance via the screen 40 of the mobile phone 4, and also can ask for the identity of the visitor (Mr. Li) and the purpose of the visit. Mr. Li also can communicate with Mr. Wang through the microphone 12 directly. Therefore, if Mr. Wang wants to buy the encyclopedia, then Mr. Wang can tell Mr. Li that he is busy at the moment and would like to make an appointment with Mr. Li at some other time. On the other hand, if Mr. Wang is not interested in the encyclopedia, then Mr. Wang can refuse Mr. Li directly. At that moment, Mr. Li may think that Mr. Wang is at home, and will not come up with an evil mind of breaking in Mr. Wang's house after pressing the electric bell 11 of Mr. Wang's house and confirming that nobody is in Mr. Wang's house because nobody answers the door.

With the ingenious idea of the present invention, if a mobile phone holder is out while a visitor pays him/her a visit, the mobile phone holder still can contact with the visitor. Undoubtedly, the present invention is a great contribution to the extensive consumers. As to the surveillance apparatus, handset, information equipment manufacturers, it is an efficient tool to stand out from the severe competition of the market.

While the invention has been described by means of specific embodiments, numerous modifications and variations could be made thereto by those skilled in the art without departing from the scope and spirit of the invention set forth in the claims.

What is claimed is:

1. A surveillance apparatus for carrying out surveillance through a mobile phone, comprising a monitor assembly for transmitting signals sequentially through a switchboard and at least one base station to the mobile phone; wherein said monitor assembly comprises:

a microprocessor, being a main control center of said monitor assembly;

a digital/analog converter, coupled with said microprocessor;

a microphone, coupled with said digital/analog converter;

a speaker, coupled with said digital/analog converter;

an electric bell, coupled with said microprocessor for sending an electric bell signal to said microprocessor when said electric bell is pressed;

a signal separator coupled to said microprocessor and disposed between said monitor assembly and said switchboard, said signal separator being arranged to be connected to a fixed telephone; and a control module coupled to said microprocessor, an end of said control module being coupled to said signal separator and the other end of said control module being coupled to a door security system of a building so that, if a visitor presses the electric bell, the door security system of the building may be used directly for asking the identity of the visitor or opening the door for the visitor, wherein, after said microprocessor receives said electric bell signal, a notice signal is sent immediately to said switchboard, said base station, and said mobile phone to notify a holder of said mobile phone that the electric bell has been pressed so that the holder of the mobile phone may carry communicate with the visitor through the microphone, speaker, switchboard, and mobile phone, and receive external telephone calls dialed to the fixed telephone through the signal separator, the switchboard, and the mobile phone, if the holder of the mobile phone is not at home.

2. The surveillance apparatus integrated with mobile phone of claim 1, wherein said monitor assembly comprises a camera control interface coupled with said microprocessor.

3. The surveillance apparatus integrated with mobile phone of claim 2, wherein said camera control interface is coupled to a camera.

4. The surveillance apparatus integrated with mobile phone of claim 1, wherein said monitor assembly comprises a memory coupled to said microprocessor.

* * * * *